April 30, 1929.   G. BOJER   1,711,037
HELM LOCKING DEVICE FOR VESSELS
Filed Dec. 17, 1926
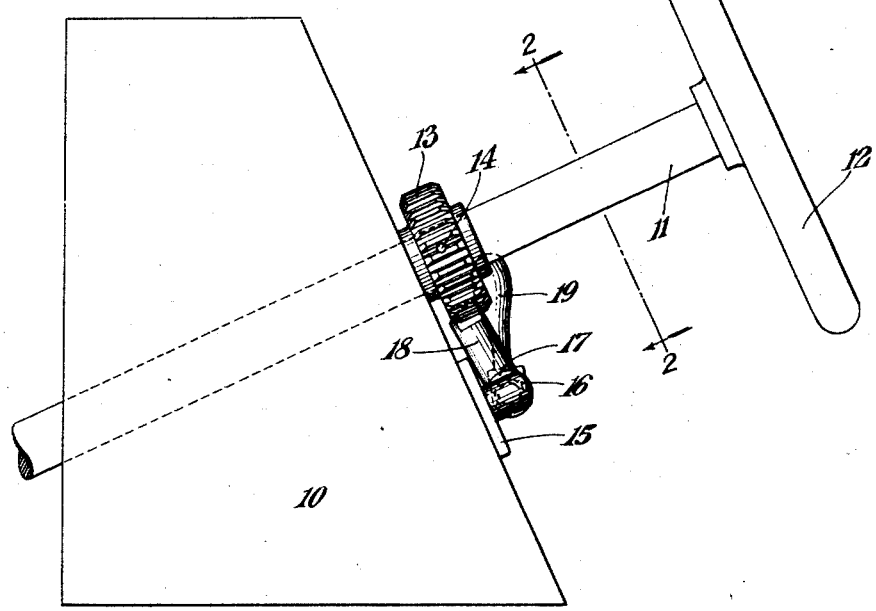
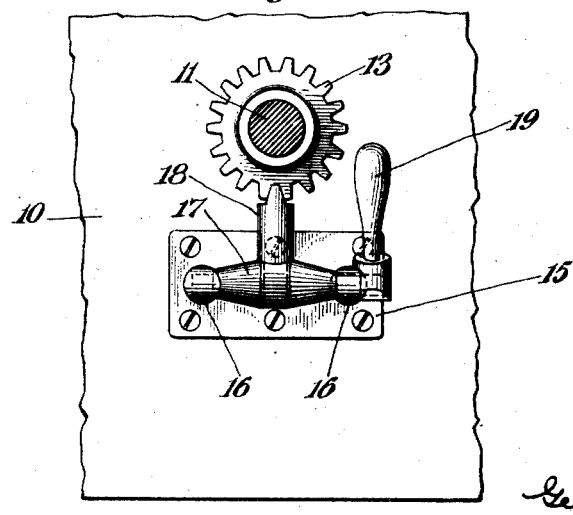
INVENTOR
George Bojer
BY
ATTORNEYS Patented Apr. 30, 1929.

1,711,037

UNITED STATES PATENT OFFICE.

GEORGE BOJER, OF HUNTINGTON, NEW YORK.

HELM-LOCKING DEVICE FOR VESSELS.

Application filed December 17, 1926. Serial No. 155,353.

This invention relates to helm locking devices for vessels.

In small vessels either of the sail or power type the rudder is often controlled by means of a hand-wheel mounted upon a rotatable shaft to which the rudder is operatively connected. It is sometimes desirable to lock the rudder at a given setting.

An object of this invention is a device for locking the steering shaft thereby locking the rudder in any desired position.

According to this invention, a spur gear is rigidly mounted on the steering shaft and there is provided a locking pawl pivotally mounted, the end of which is adapted to engage the teeth of the gear. A handle is provided for operating the pawl, the handle being so arranged relative to the pawl that the latter is held in locking or unlocking position by gravity.

Referring now to the drawings,

Figure 1 discloses a steering wheel equipped with the invention; and

Figure 2 is a section on the line 2—2 of Fig. 1.

10 designates a wheel box or support in which is rotatably mounted the steering shaft 11 having the steering wheel 12 mounted on one end. A spur gear 13 is mounted on the shaft 11 and is rigidly attached thereto by suitable means such, for example, as set screw 14 or the like. The shaft 11 is mounted at an inclination and the face of the wheel box is substantially perpendicular thereto. On the face of the wheel box and below the shaft 11 is mounted a plate 15 having projecting lugs 16. In the lugs 16 are journaled the ends of a shaft 17 from which projects a pawl 18 the end of which is adapted to engage the teeth of the spur gear 13. A handle 19 is attached to one end of the shaft 17 and is angularly off-set slightly from the pawl 18 so that when the latter is in the position shown the handle 19 is to the left of a vertical line passing through the axis of the shaft 17.

The pawl 18 is, therefore, held in operative position by gravity. Also when the pawl is disengaged from the spur gear, the handle 19 has been moved to the right of the vertical line above mentioned and will fall by gravity until it contacts with the face of the wheel box. The pawl will thus be held in inoperative position by gravity.

When it is desired to keep the vessel on a steady course, the wheel 12 may be rotated properly to set the rudder after which the pawl 18 may be engaged with the teeth of the spur gear 13 by operating the handle 19. The pawl will be kept in engagement with the teeth under the influence of gravity acting on the handle 19 so that the steering shaft will remain locked until the handle is operated.

Having thus described my invention, what I claim as new and desire to secure by Letters Patent of the United States is:

In a device of the character described, a steering shaft, a spur gear rigidly mounted thereon, a horizontal shaft having its axis lying in a plane perpendicular to the axis of said steering shaft, a radial pawl mounted on said shaft and adapted to engage the teeth of said gear and a radial handle carried by said shaft and offset angularly slightly from said pawl, said pawl being inclined to the vertical when in operative position and held in such position by gravity.

In testimony whereof, I have signed my name to this specification.

GEORGE BOJER.